March 23, 1943.   E. V. CARLSSON   2,314,387
BALANCED DIET SELECTING APPARATUS
Filed Oct. 20, 1941   2 Sheets-Sheet 1
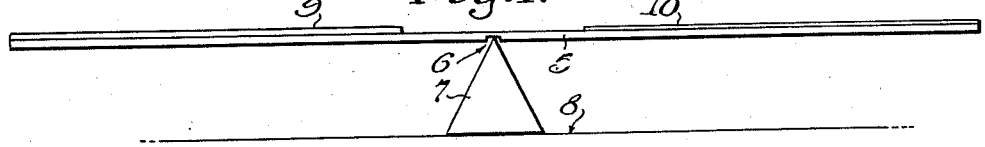
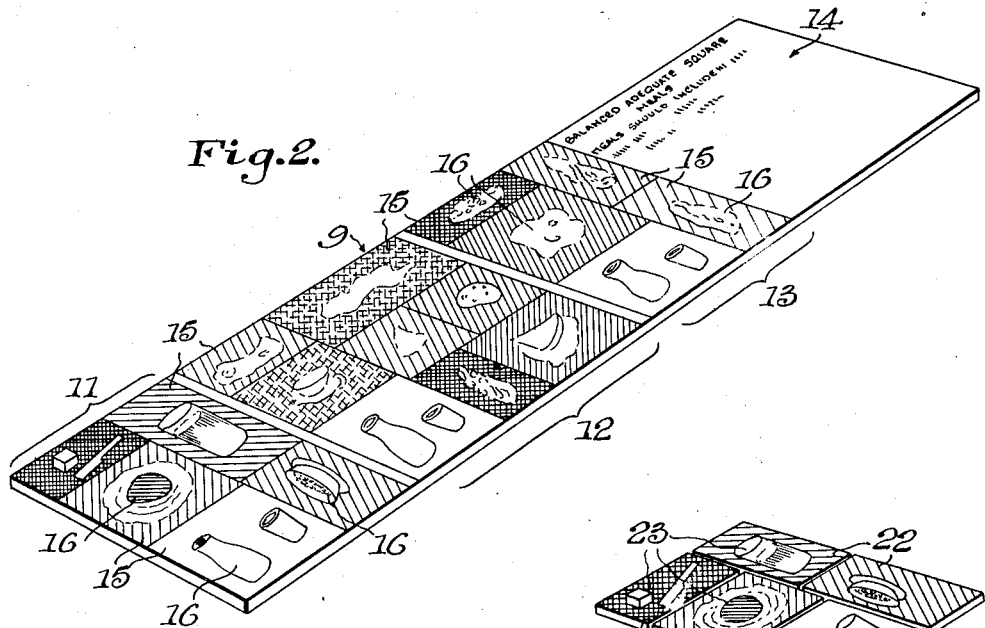
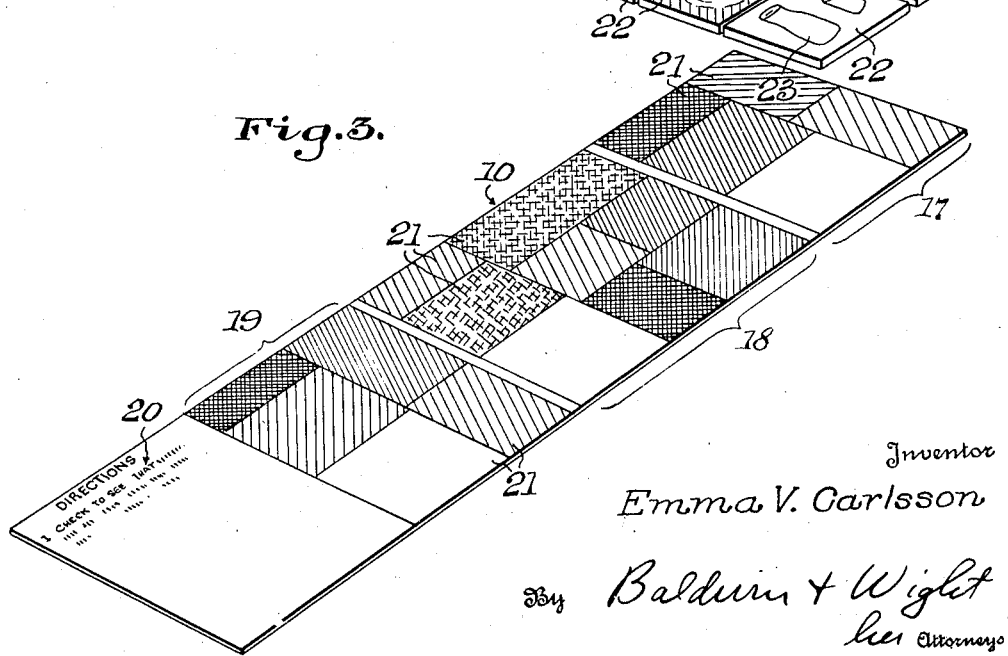
Inventor
Emma V. Carlsson
By Baldwin & Wight
her Attorneys March 23, 1943.  E. V. CARLSSON  2,314,387
BALANCED DIET SELECTING APPARATUS
Filed Oct. 20, 1941  2 Sheets-Sheet 2

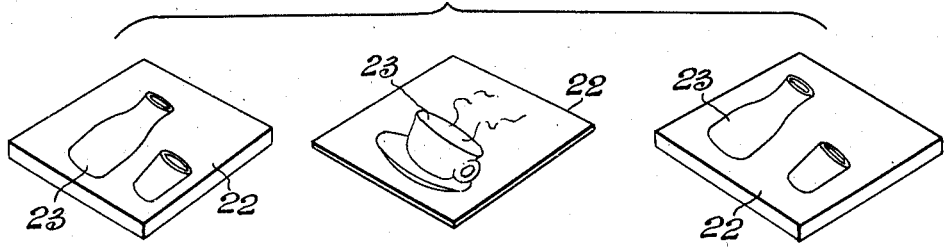
Fig. 4.

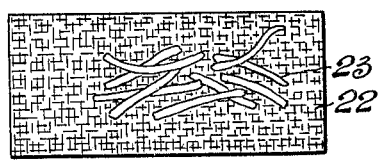
Fig. 5.

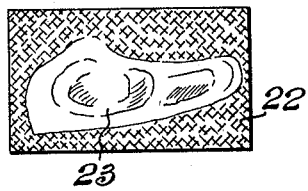
Fig. 6.

Fig. 7.

```
ANY COLORED VEGETABLES RAW OR COOKED        —24
THEY ARE RICH IN MINERALS AND VITAMINS
TURNIPS AND MUSTARD GREENS                  —22
COLLARDS OR CABBAGE
CRESS (GARDEN) OR LETTUCE
CARROTS OR TOMATOES RAW
WHY IS IT IMPORTANT TO EAT RAW VEGETABLES?
WHY SHOULD WE NOT POUR OUT COOKING WATER?
WHY COOK VEGETABLES WITHOUT COVER ON
              KETTLE?
```

Fig. 8.

```
24—  SIDE MEAT (FAT PORK)
        RICH IN CALORIES
     NO SUBSTITUTE FOR LEAN MEAT
22—    LACKS FOOD ESSENTIALS
     LIKE PROTEIN PHOSPHORUS
     AND IRON FOUND IN LEAN
              MEATS
```

Inventor
Emma V. Carlsson
By Baldwin & Wight
Attorneys

Patented Mar. 23, 1943

2,314,387

UNITED STATES PATENT OFFICE 2,314,387

BALANCED DIET SELECTING APPARATUS

Emma Victoria Carlsson, Greensboro, N. C.

Application October 20, 1941, Serial No. 415,820

12 Claims. (Cl. 35—1)

The invention relates generally to educational appliances and primarily seeks to provide a novel apparatus which can be used with facility and to great advantage in instructing persons as to what constitutes balanced diet and how to make selections of balanced diet meals in a liberal, moderate cost or low cost diet.

In the present day when so many persons have become diet conscious, primarily for weight controlling purposes rather than for improving and preserving health, too much consideration is being given to the amount of food consumed and too little to the nature of the food. As a result, many persons are living on badly balanced diets and are sacrificing health in order to attain a certain weight, usually much less than it should be. Dieting to reduce weight is quite all right when done intelligently with properly balanced meals. It is well known, however, that the best of health cannot be enjoyed and maintained unless persons consume balanced meals sufficient unto their own particular needs, that is, food and drink in quantity suitable to the nature of the occupation of the individual, and properly balanced in the amounts of fats, carbohydrates, proteins, salts, roughage and vitamins contained therein. Properly educated as to the dangers of unbalanced diet, and as to what constitutes balanced diet, it is thought that all normal, intelligent persons will be able to attain and maintain good health. It is the purpose of the present invention to provide means for so educating persons.

In its more detailed nature the invention resides in the provision of a balancing support in the nature of a see-saw or teeter board fulcrumed centrally, an example card mountable on the board at one end thereof and having illustrated thereon the elements of at least one balanced diet meal, and selective blocks of different weights each having illustrated thereon an element of a meal and being adapted to be placed on the other end of said board. The relation of the illustrations on the blocks to their respective weights is such that if blocks together illustrating a balanced diet meal or meals are placed on the board in a single layer and respectively on predetermined board areas the weights on opposite sides of the fulcrum will be equal and the board, once placed in horizontal position, will remain in such position. On the other hand, if the blocks placed on the board collectively illustrate an improperly balanced diet meal or meals, then the weights on opposite sides of the fulcrum will be unequal and the board will tip from the horizontal position.

An object of the invention is to provide an apparatus of the character stated in which the example card has three panels thereon each illustrating a balanced diet meal, namely, breakfast, dinner and supper, and in which the selective blocks are mountable on three panels on said other end of the board to thereon represent the selection of properly balanced menus for breakfast, dinner and supper and to maintain the board mechanically balanced to prove out the fact that proper selections have been made.

Another object of the invention is to provide in apparatus of the character stated selective blocks of different weights some of which will and some of which will not properly balance out with complementary card portions on the other end of the board, each said block having inscribed thereon indicia intended to educate a user of the apparatus as to why each selected block is appropriate for or inappropriate for use in the balanced meal being selected.

Another object of the invention is to provide an apparatus of the character stated in which each element of each meal depicted on the example card is illustrated on a background of distinctive shape and color, and each of the selective blocks has its food element illustrated on a background corresponding in shape and color with the background of the same type of food element on the example meal and being placeable on a predetermined receiving space of like color and shape provided to receive the same on the end of the board other than that which receives the example card.

With the above and other objects in view which will more fully appear, the nature of the invention will be more clearly understood by following the description, the appended claims, and the several views illustrated in the accompanying drawings.

In the drawings:

Figure 1 is a side view illustrating the invention.

Figure 2 is an enlarged perspective view illustrating the example card.

Figure 3 is a view similar to Figure 2 illustrating the card whereon the selective blocks are placed to represent selected, properly balanced meals, a selection of blocks representing one selected meal being illustrated above and out of contact with one panel on said card.

Figure 4 is a perspective view illustrating a plurality of the selective blocks of like face area and color.

Figure 5 is a face view illustrating one of a plurality of selective blocks of another face area and color.

Figure 6 is a face view illustrating one of a plurality of selective blocks of still another face area and color.

Figure 7 is a reverse face view of one acceptable block.

Figure 8 is a view similar to Figure 7 but illustrating one unacceptable block.

In the practical development of the invention, there is employed a see-saw or teeter board 5 having a center designation, preferably a kerf 6, at its under face and engageable with a fulcrum or pivot support 7 which is mountable on a table or other support 8 spaced a distance below the board in the manner clearly illustrated in Figure 1 of the drawings. An example card 9 is removably mountable at one end of the board, the left as viewed in Figure 1, and a selection or problem card 10 is removably mountable on the other end of the board.

The card 9 is equipped with a panel 11 having thereon illustrations of food and beverage elements collectively comprising a balanced diet breakfast, a panel 12 having thereon illustrations of food and beverage elements collectively comprising a balanced diet dinner, a panel 13 having thereon illustrations of food and beverage elements collectively comprising a balanced diet supper, and a panel 14 having printed or otherwise inscribed thereon instructions concerning or definitions of what properly comprises balanced diet meals. Each of the panels 11, 12 and 13 is divided into a plurality of individual rectangles 15 each of distinct shape and color, and on each rectangle is illustrated at 16 a food or beverage item.

The card 10 is equipped with a panel 17 for receiving a plurality of selective blocks intended to represent a selected properly balanced breakfast, a panel 18 for receiving a plurality of selective blocks intended to represent a selected properly balanced dinner, a panel 19 for receiving a plurality of selective blocks intended to represent a selected properly balanced supper, and a panel 20 having printed or otherwise inscribed thereon suitable directions for the proper use of the improved apparatus. Each panel 17, 18 and 19 is divided into individual rectangles 21 corresponding in number, shape and color with those on the corresponding breakfast, dinner or supper panel on the card 9 and intended to receive the individual selective blocks hereinbefore referred to. The card 10 independent of the selected blocks is lighter in weight than the card 9 which is removably mounted in similar manner at the opposite end of the board but can be made to balance said card 9 and the board 5 as a whole when the proper complements of selective blocks are placed on the panels 17, 18 and 19. While it is preferred that the card 10 be removably mounted on the board 5, it is to be understood that the panels 17, 18 and 19 may be directly imposed upon the board so as to be an integral part thereof if desired.

A large number of selective pieces or blocks 22 are provided, and groups of related blocks, that is, a plurality of blocks which illustrate food or beverage elements of like types are of the same surface area and bear the same background color as the panel rectangle 15 on one of the panels 11, 12 or 13 of the card 9 which bears the illustrations 16 of a like type of food or beverage. See Figures 3, 4, 5 and 6. Each of the blocks 22 has illustrated thereon, as at 23, a selected food or beverage item of the same type as the item 16 on the card 9 just referred to, and on the back of each block 22 there is printed or otherwise inscribed, as at 24, educational data explaining the nature and value of the particular food or beverage item. See Figures 7 and 8. It will be obvious by reference to Figure 4 of the drawings that the selective blocks 22 of each like color and shape group are of different thicknesses or weights, and it will be obvious that unless the proper food or beverage item is selected in each instance, the full complement of blocks placed upon the panels of the card 10 will not properly balance the card 9, or the board 5 as a whole, and this lack of balance will indicate to a user of the apparatus that the proper selection of meals has not been made.

Two examples of the educational data applied at the back of each block 22 are given below and attention is directed to Figures 7 and 8 of the drawings.

*All lean meats contain:*

Excellent protein for growth of muscles and repair of tissues.
Good sources of: phosphorus, iron, thiamin and riboflavin.
Liver is also rich in vitamin A.
Substitutes are: eggs, soy beans, fish, poultry.

*Any colored vegetables raw or cooked*

They are rich in minerals and vitamins.
Turnip or mustard greens; collards or cabbage; cress (garden) or lettuce; carrots or tomatoes raw.
Why is it important to eat raw vegetables?
Why should we pour out cooking water?
Why cook vegetables without cover on kettle?

In Figure 7 of the drawings, there is illustrated the reverse face of an acceptable, selective block, that is, a block which when placed on one of the panels 17, 18 or 19 will balance the portion of the card 9 illustrating a food or beverage element of like type on one of the panels 11, 12 or 13. The markings or educational data on the reverse face of such a block are quoted immediately above. The unacceptable blocks, such as are indicated in Figure 8 and by the thinner block in Figure 4, are of such weight that they will not properly balance the card portions of like area and color on the panels of the card 9, and these unacceptable blocks include on their reverse faces not only educational data indicating the nature of the particular food or beverage element, but also data clearly explaining why that particular food or beverage element is unacceptable in the desired balanced meal. Two examples of data placed upon such unacceptable blocks are given below and attention is directed to Figure 8 of the drawings.

*Side meat (fat pork)*

Rich in calories.
No substitute for lean meat.
Lacks food essentials like protein, phosphorus and iron found in lean meat.

*Tea and coffee*

Lack proteins, minerals, and vitamins found in milk.
They are stimulants.

It is preferred that three selectively mountable cards 9 be provided, one illustrating example meals for a given day suitable for a person desiring a liberal diet, one suitable for a person desiring a moderate cost diet, and one suitable for a person desiring a low cost diet. Educational data outlining one or more acceptable liberal, moderate, and low cost diets may be printed or otherwise inscribed directly upon a suitable portion of the card 9, or if desired separate cards or charts showing such diets can be provided. Examples of this educational data are given below.

Liberal diet

| Breakfast | Dinner | Supper |
|---|---|---|
| Orange juice, one egg, whole grain cereal, top milk or cream, toast and butter, milk one cup. | Baked chicken, sweet potato, celery, peas and carrots, string beans, ice cream, molasses cookies. | Creamed asparagus on toast, cold sliced chicken, fruit salad, whole wheat rolls and butter, milk one cup. |

Milk one quart per day, one egg per day, meat, fish or poultry once a day, often twice a day, potatoes and sweet potatoes once a day, dry cooked beans, cooked peas, nuts once a week, tomatoes, citrus fruit or other vitamin rich food twice a day, leafy, green and yellow vegetables 1 or 2 servings a day, other vegetables and fruits 2 or 3 servings a day, wide variety of cereals, breads, other baked goods and desserts.

Moderate cost diet

| Breakfast | Dinner | Supper |
|---|---|---|
| Tomato juice, whole grain cereal, top milk, scrambled egg, bread or rolls, milk one cup. | Roast beef, sweet potato baked, turnip greens, creamed carrots, milk one cup, bread and butter, fresh fruit. | Baked vegetables casserole, fruit salad, bread and butter, milk one cup. |

Milk one quart per day, eggs five per week, lean meat, fish and poultry 7 or 8 servings per week, potatoes and sweet potatoes once or twice a day, tomatoes, citrus fruit or other vitamin rich food 5 or 6 servings per week, leafy, green and yellow vegetables 1 or 2 servings per day, other vegetables and fruits about two servings per day, cereal daily, bread with every meal, dessert once a day sometimes twice.

Low cost diet

| Breakfast | Dinner | Supper |
|---|---|---|
| Tomato juice, whole grain cereal, top milk, whole grain bread with molasses. | Soy beans with fat pork, salad raw cabbage, string beans, bread and butter, milk one cup, stewed fruit<br>or<br>Small serving fish, sweet potatoes baked, string beans, raw cabbage slaw, bread and butter, milk one cup, stewed fruit. | Green pea soup or vegetable soup, soy beans, bread and butter, milk one cup<br>or<br>Baked navy beans, salad, bread and molasses, milk one cup. |

Milk 3 cups per day, eggs 3 or 4 per week, lean meat, fish 5 or 6 small servings a week, potatoes and sweet potatoes twice a day, dry cooked beans, cooked peas, nuts, four times a week, tomatoes, citrus fruit, or other vitamin rich foods, 5 servings a week, leafy, green and yellow vegetables 6 servings per week, other vegetables and fruits 6 servings per week, cereals once a day, sometimes twice, bread in some form at every meal, dessert about once a day.

In the practical use of the apparatus, the board 5 is placed upon the fulcrum support 7, care being exercised to see that the board is perfectly centered as by placing the crest of the support 7 directly in the center kerf 6. The card 9 illustrating the desired type of diet, namely, liberal, moderate, or low cost, is placed upon one end of the board, and the child, student, or other person using the apparatus then proceeds to select the blocks 22 which are to be assembled in the selection of balanced adequate square meals and places them in proper positions on the selection or problem card 10 which has been placed at the other end of the board, or directly upon the board when the panels 17, 18 and 19 have been directly imposed thereon.

By observing the shapes of the blocks 22, the background color thereon and the illustrations 23 of the particular food or beverage item thereon, the corresponding shapes and colors of the rectangles 21 on the panels 17, 18 and 19 of the card 10, reference also being made to the meal example illustrations on the panels 11, 12 and 13 of the card 9, selections of the food or beverage elements intended to comprise the individual meals to be represented on the panels 17, 18 and 19 can be made. The board with the cards and blocks placed thereon is then held for a moment in horizontal position and released carefully. If the proper selections have been made the imposed weight at one side of the board will balance the imposed weight at the opposite side of the fulcrum 7, and the board will be mechanically balanced and will remain in horizontal position. When one or more improper selections have been made the board will not be mechanically balanced and upon being released will tip from horizontal position, indicating that an improperly balanced diet has been selected. It will then be necessary for the user of the apparatus to carefully inspect his selections to determine the error in selection. This can be determined by observing the data imprinted on the blocks and by observation of the relative thicknesses of the blocks.

It will be obvious that by constant use of the apparatus and the resultant frequent perusal of the educational data on the cards and on the blocks, users of the apparatus will become well versed in the nature and requirements of balanced adequate square meals and most phases of diet.

It is of course to be understood that the details of structure and arrangement of parts may be variously changed and modified without departing from the spirit and scope of the invention.

I claim:

1. In apparatus of the character described, a centrally fulcrumed balancing board, means adapted to be placed over a predetermined area on one end of the board to illustrate food and beverage elements collectively comprising an example of a balanced diet meal, and a plurality of selective pieces each illustrating a food or beverage element and adapted to be placed in a single layer and respectively on predetermined areas on the other end of the board in number and relative arrangement equivalent to the number and relative arrangement of food and beverage elements illustrated on said example meal illustrating means and collectively effective together with said example means for bringing about equal distribution of weight on opposite sides of said fulcrum only when the meal selected by the selected plurality of pieces balances said example meal.

2. In apparatus of the character described, a centrally fulcrumed balancing board, means adapted to be placed over a predetermined area on one end of the board to illustrate food and beverage elements collectively comprising three balanced diet meal examples, one breakfast, one dinner and one supper, and a plurality of selective pieces each illustrating a food or beverage element and adapted to be placed in a single layer and respectively on predetermined areas on the other end of the board in grouping and number equivalent to the grouping and number of food and beverage elements illustrated on said example meal illustrating means and collectively effective together with said example means for bringing about equal distribution of weight on opposite sides of said fulcrum only when the meals selected by the selected plurality of pieces balance said example meals.

3. In apparatus of the character described, a centrally fulcrumed balancing board, selective means adapted to be placed over a predetermined area on one end of the board to illustrate food and beverage elements collectively comprising an example of a balanced diet meal of a liberal, moderate or low cost diet, and a plurality of selective pieces each illustrating a food or beverage element and adapted to be placed in a single layer and respectively on predetermined areas on the other end of the board in number and relative arrangement equivalent to the number and relative arrangement of food and beverage elements illustrated on said example meal illustrating means and collectively effective together with said example means for bringing about equal distribution of weight on opposite sides of said fulcrum only when the meal selected by the selected plurality of pieces balances said example meal.

4. In apparatus of the character described, a centrally fulcrumed balancing board, selective means adapted to be placed over a predetermined area on one end of the board to illustrate food and beverage elements collectively comprising three balanced diet meal examples, one breakfast, one dinner and one supper, of a liberal, moderate or low cost diet, and a plurality of selective pieces each illustrating a food or beverage element and adapted to be placed in a single layer and respectively on predetermined areas on the other end of the board in grouping and number equivalent to the grouping and number of food and beverage elements illustrated on said example meals illustrating means and collectively effective together with said example means for bringing about equal distribution of weight on opposite sides of said fulcrum only when the meals selected by the selected plurality of pieces balance said example meals.

5. An apparatus as defined in claim 1 in which each food or beverage element illustrated on said example illustrating means is illustrated over a background of distinctive color, and in which each food or beverage element illustrated on each selective piece is illustrated over a background of distinctive color corresponding with the colored background of a comparable type of food or beverage on said example illustrating means.

6. An apparatus as defined in claim 1 in which each food or beverage element illustrated on said example illustrating means is illustrated over a background of distinctive color and shape, and in which each food or beverage element illustrated on each selective piece is illustrated over a background of distinctive color and shape corresponding with the color and shape of the background of a comparable type of food or beverage on said example illustrating means.

7. In apparatus of the character described, a centrally fulcrumed balancing board, means adapted to be placed over a predetermined area on one end of the board to illustrate food and beverage elements collectively comprising an example of a balanced diet meal, and a plurality of selective pieces each illustrating a food or beverage element and adapted to be placed in a single layer and respectively on predetermined areas on the other end of the board in number and relative arrangement equivalent to the number and relative arrangement of food and beverage elements illustrated on said example meal illustrating means, some of said pieces being acceptable as illustrating elements in a balanced adequate square meal and some being unacceptable, the selected pieces being collectively effective together with said example means for bringing about equal distribution of weight on opposite sides of said fulcrum only when the meal selected by said selected pieces balances said example meal, said acceptable pieces having educational data thereon relating to the value of the particular illustrated element, and each unacceptable piece having educational data thereon explaining why the piece is unacceptable.

8. In apparatus of the character described, a centrally fulcrumed balancing board, means adapted to be placed over a predetermined area on one end of the board to illustrate food and beverage elements collectively comprising an example of a balanced diet meal, and a plurality of selective pieces each illustrating a food or beverage element and adapted to be placed in a single layer and respectively on predetermined areas on the other end of the board in number and relative arrangement equivalent to the number and relative arrangement of food and beverage elements illustrated on said example meal illustrating means, said pieces being of various weights some of which will and some of which will not properly balance out with complementary food or beverage illustrating portions on said example meal illustrating means, the illustrations on the pieces being so related to the weights of the respective pieces that the pieces placed on the board will be collectively effective together with said example means for bringing about equal distribution of weight on opposite sides of said fulcrum only when the meal selected on said selected pieces balances the meal pictured on the example meal illustration.

9. In apparatus of the character described, a centrally fulcrumed balancing board, means adapted to be placed over a predetermined area on one end of the board to illustrate food and beverage elements collectively comprising three balanced diet meal examples, one breakfast, one dinner and one supper, and a plurality of selective pieces each illustrating a food or beverage element and placeable on the other end of the board in grouping and number equivalent to the grouping and number of food and beverage elements illustrated on said example meal illustrating means, said pieces being of various weights some of which will and some of which will not properly balance out with complementary food or beverage illustrating portions on said example meal illustrating means, the illustrations on the pieces being so related to the weights of the respective pieces that the pieces placed on the board will be collectively effective together with said example means for bringing about equal distribution of weight on opposite sides of said fulcrum only when the three meals selected by placement of the selected pieces balance the three meals pictured on the example meal illustration.

10. An apparatus as defined in claim 1 in which each food or beverage element illustrated on said example illustrating means is illustrated over a background of distinctive color and shape, in which the board is provided at its other end with selective piece receiving spaces shaped, colored and grouped to correspond with the food and beverage illustrating portions on the example meal illustration, and in which each food or beverage element illustrated on each selective piece is illustrated over a background of distinctive color and shape corresponding with the color and shape of the background of a comparable type of food or beverage on said example illustrating means.

11. An apparatus as defined in claim 2 in which each food or beverage element illustrated on each of said three meal examples is illustrated over a background of distinctive color and shape, in which the board is provided at its other end with selective piece receiving spaces shaped, colored and grouped to correspond with the food and beverage illustrating portions of each illustrated example meal, and in which each food or beverage element illustrated on each selective piece is illustrated over a background of distinctive color and shape corresponding with the color and shape of the background of a comparable type of food or beverage on at least one of the three meal examples.

12. An apparatus as defined in claim 2 in which each food or beverage element illustrated on each of said three meal examples is illustrated over a background of distinctive color and shape, in which the board is provided at its other end with selective piece receiving spaces shaped, colored and grouped to correspond with the food and beverage illustrating portions of each illustrated example meal, and in which each food or beverage element illustrated on each selective piece is illustrated over a background of distinctive color and shape corresponding with the color and shape of the background of a comparable type of food or beverage on at least one of the three meal examples, and in which said placeable means includes a support card bodily placeable on and removable from the board and being one selected from at least three such cards each illustrating an example of balanced diet meals for a day of a liberal, moderate or low cost diet.

EMMA VICTORIA CARLSSON.